United States Patent [19]

Miyaoka

[11] Patent Number: 4,990,842

[45] Date of Patent: Feb. 5, 1991

[54] OPERATION CONTROL METHOD AND DEVICE FOR CONSTRUCTION MACHINE

[75] Inventor: Satoshi Miyaoka, Hiroshima, Japan

[73] Assignee: Kabushiki Kaisha Kobe Seiko Sho, Kobe, Japan

[21] Appl. No.: 479,999

[22] Filed: Feb. 14, 1990

[30] Foreign Application Priority Data

Feb. 14, 1989 [JP] Japan .................................. 1-35802

[51] Int. Cl.[5] .............................................. F16D 31/02

[52] U.S. Cl. .................................... 318/590; 318/563; 200/5 R; 200/6 A; 60/427; 60/389

[58] Field of Search ............................... 318/560–640; 200/1 R–6, 332, 329, 335, 339, 331, 553; 74/469, 481, 491, 495, 501.5 H; 60/289, 393, 389, 427–443

[56] References Cited

U.S. PATENT DOCUMENTS

| | | | |
|---|---|---|---|
| 4,206,602 | 6/1980 | Watson et al. | 60/433 |
| 4,309,582 | 1/1982 | Coors | 200/6 A X |
| 4,315,113 | 2/1982 | Fisher et al. | 200/6 A X |
| 4,356,357 | 10/1982 | Fisher | 200/5 R |
| 4,422,619 | 12/1983 | Griffiths | 318/563 X |
| 4,455,459 | 6/1984 | Smith | 200/5 R |
| 4,458,485 | 7/1984 | Seelman | 60/427 X |
| 4,489,551 | 12/1984 | Watanabe et al. | 60/389 X |
| 4,489,552 | 12/1984 | Watanabe et al. | 60/389 |
| 4,528,813 | 7/1985 | Izumi et al. | 60/389 |
| 4,587,808 | 5/1986 | Watanabe et al. | 318/590 X |
| 4,599,855 | 7/1986 | Seelman | 60/427 X |
| 4,631,920 | 12/1986 | Seelman | 60/421 |
| 4,756,156 | 7/1988 | Appel | 60/427 X |

*Primary Examiner*—Paul Ip

*Attorney, Agent, or Firm*—Oblon, Spivak, McClelland, Maier & Neustadt

[57] ABSTRACT

An operation control device for a construction machine is constructed of a remote control valve having a member moveable in proportion to an operating lever stroke and having a plurality of devices engaged with the member and operable in association therewith. A part of the plural devices include a proportional hydraulic signal generator for reducing a hydraulic pressure from a hydraulic pressure source in proportion to a moving quantity of the member and generating a signal as a pilot pressure, and a part or the other of the plural devices including a proportional electric signal generator for generating an electric signal proportional to the moving quantity of the member.

6 Claims, 7 Drawing Sheets

OPERATION CONTROL METHOD AND DEVICE FOR CONSTRUCTION MACHINE

BACKGROUND OF THE INVENTION

The present invention relates to an operation control method and device for a construction machine for effecting easy and reliable control of complicated operations including operations of working devices and movement of a body of the construction machine.

In the prior art construction machine, power distribution and control for operations of various working devices, attitude setting, position retention, movement of the machine body and operation speed are effected by operating an operating lever, pedal, etc. provided in a cab or near a driving seat in forward and reverse, upward and downward, or right and left directions. In relation to enlargement in scale of the construction machine and for the purposes of improvement in a working efficiency and reduction in fatigue of an operator, the above operations are effected through a boosting mechanism utilizing hydraulic, pneumatic or electric devices.

Recently, execution by human power has been replaced by that by a construction machine, and the construction machine is desired to have an operability suitable for very careful work with quickness, safety and economy without any special skill of the operator.

To satisfy such a desire, it is necessary to provide a control system capable of distributing power according to various working conditions, working loads and operation quantities of the operating lever, etc., retaining a relative working speed ratio among related working devices, and smoothly operating each actuator. The operation of the control system cannot be assured by the ability of the operator only. Therefore, in a construction machine utilizing a hydraulic power, for example, power distribution for operation of the working devices is effected by a pilot hydraulic pressure to be obtained by the operation by the operator, while control operation according to the working conditions, etc. is effected by monitoring a condition of each part of the machine with a pickup or sensor and generating a new electric signal by the operator to obtain a desired operating condition of the machine. In this manner, the control operation of the machine is rendered complex.

Such a control system in the prior are will now be described by way of example of a conventional control signal generating device.

FIG. 6 is a sectional view of an essential part of a hydraulic remote control valve. In general, the remote control valve includes push rods 3*a* and proportional hydraulic signal generating means 4*a* at four radial positions equally spaced from each other about an operating lever 2*a*. When the operating lever 2*a* is tilted in forward, reverse, right and left directions, one or two of the push rods 3*a* is/are depressed downwardly. As a result, a spring included in the proportional hydraulic signal generating means 4*a* is compressed by a moving quantity of the push rods 3*a*, that is, by a quantity proportional to a tilt angle of the operating lever 2*a*. As the spring is compressed, a reaction force thereof is increased. At this time, until a hydraulic pressure balancing the increased reaction force is generated, a pressure oil in a hydraulic pressure source 6 is allowed to flow into a hydraulic signal port 10. On the other hand, when the operating lever 2*a* is returned to a neutral position from the condition where a signal pressure is retained in the hydraulic signal port 10, and the reaction force of the spring in the proportional hydraulic signal generating means 4*a* is accordingly reduced, the hydraulic signal port 10 is brought into communication with a tank port 7 to reduce the signal pressure.

FIG. 7 is a diagrammatic view of a hydraulic system of the proportional hydraulic signal generating means 4*a* and 4*a'0* located on the right and left sides of the operating lever 2*a*, showing that a signal pressure proportional to a tilt angle of the operating lever 2*a* in the right and left directions is transmitted to pilot lines 8 and 8'. FIG. 8 is a characteristic graph showing the relationship between an operating lever stroke S and an signal pressure Pi in the proportional hydraulic signal generating means 4*a* or 4*a'*. By utilizing this proportional characteristic, remote control such as control of an operating degree of a hydraulic selector valve, for example, is carried out.

FIG. 9 is a sectional view of an essential part of a conventional device for generating an electric signal proportional to a tilt angle of an operating lever 2*b*. As similar to the above-mentioned remote control valve, push rods 3*b* and proportional electric signal generating means 5*a* associated with the push rods 3*b* are located at four radial positions about the operating lever 2*b*. Such a device is called a joy stick. The proportional electric signal generating means 5*a* is constructed by a potentiometer as shown in FIG. 10. When the operating lever 2*b* is operated in a certain direction, one or two of the push rods 3*b* present in this direction is/are moved downwardly, and an internal electric resistance of the proportional electric signal generating means 5*a* is changed with a change in position of contacts associated with the push rods 3*b*, thereby changing an electric signal. As shown in FIG. 11, a signal voltage Ei is increased in proportion to an operating lever stroke S. It is a matter of course that this characteristic may be readily modified in such a manner as to reduce the signal voltage Ei in proportion to the operating lever stoke S.

As described above, the remote control hydraulic signal generating devive and the electric signal generating device in the prior art are independent products. The remote control valve is mainly employed for control requiring a strong operating force in a remote control system, while the joy stick is employed for a so-called mechatronic control such that the information of the operating lever stroke is added to an electric signal detected according to an operation and condition of some parts to generate a new electric signal. In this manner, the remote control valve and the joy stick are independently employed, or they are sometimes employed simultaneously. Thus, the construction is complex, and the operation tends to be troublesome.

SUMMARY OF THE INVENTION

It is accordingly an object of the present invention to provide an operation control method and device for a construction machine which includes a signal operating lever and means for simultaneously generating a plurality of signals inclusive of a hydraulic and electric signal proportional to a lever stroke of the operating lever, wherein the plural signals are simultaneously supplied to plural control systems in the construction machine exhibiting different functions, thus obtaining a desired rational operation of the construction machine.

The control method for rationally effecting various operations in the construction machine is achieved by the following control signal generating device according to the present invention. That is, the operation control device is constructed of:

(1) a remote control valve having a member adapted to be moved in proportion to an operating lever stroke and having a plurality of means engaged with said member and adapted to be operated in association therewith;

(2) a part of said plural means comprises proportional hydraulic signal generating means for reducing a hydraulic pressure from a hydraulic pressure source in proportion to a moving quantity of said member and generating a signal as a pilot pressure; and (3) a part or the other of said plural means comprises proportional electric signal generating means for generating an electric signal proportional to the moving quantity of said member.

With this construction, when the operating lever is operated, so as to operate a main working device or move a body of the construction machine having a hydraulic circuit of the above control device, a hydraulic signal and an electric signal proportional to an operational quantity of the operating lever are simultaneously obtained. For example, the hydraulic signal is connected to a pilot oil chamber in a pilot pressure selecting type hydraulic selector valve for operating a main working device, and the electric signal generating simultaneously with the hydraulic signal is connected directly to a receiving section in a main pump, selector valve or throttle valve, or through a controller for generating a new command electric signal to be obtained from the above electric signal and an electric signal indicative of an engine speed, output or an actuator load pressure. Accordingly, a desired operational condition can be automatically maintained at all times, and in case of requiring a minute operation of the operating lever or different control signals, a plurality of parts can be controlled by the operation of a single operating lever without independently providing and operating different operating levers.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to the drawings.

Figure 1:
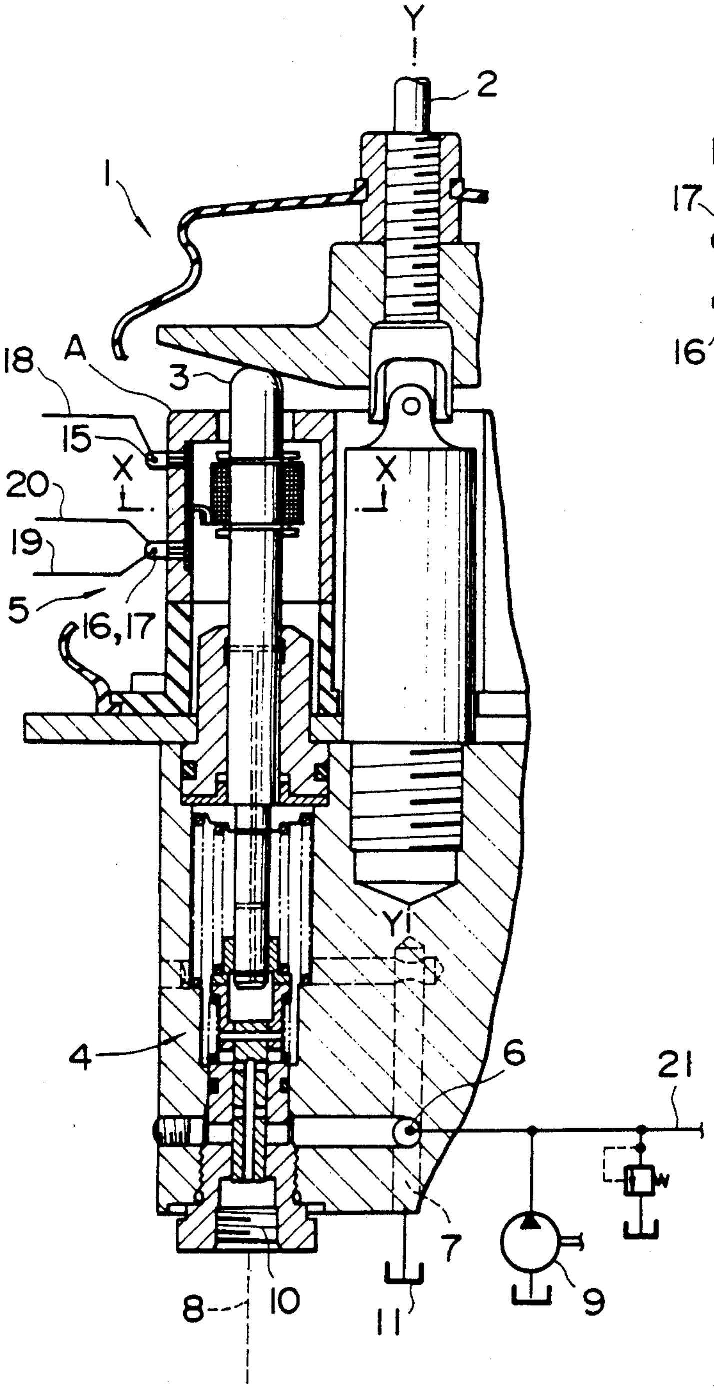
FIG. 1 is a sectional view of an essential part of the control signal generating device in case of a dual system according to the present invention.

FIG. 1 is a sectional view of an essential part of a control signal generating device 1 according to the present invention. Referring to FIG. 1, reference numeral 2 designates an operating lever on an operating station provided near a driving seat of a construction machine. The operating lever 2 is adapted to be tilted with respect to its mounting central axis Y—Y through a universal joint in all of forward, reverse, right and left directions. Push rods 3 are longitudinally movable and are provided at radial positions about the central axis Y—Y, normally at front, rear, right and left positions. A top end of each push rod 3 is in contact with a lower surface of a dish-like member adapted to be tilted together with the operating lever 2.

Reference numeral 4 designates proportional hydraulic signal generating means having a function similar to that of the means 4a in the prior art remote control valve as mentioned previously. The proportional hydraulic signal generating means 4 functions to change a specified pressure of a hydraulic oil supplied from a pilot pump 9 through a line 21 and an oil pressure source port 6 in proportion to a tilt angle of the operating lever 2, that is, a displacement of the push rod 3 and to supply the oil pressure as a pilot pressure from a hydraulic signal port 10 through a pilot line 8 to a pilot oil chamber of a desired equipment to be controlled such as a hydraulic selector valve.

Figure 2:
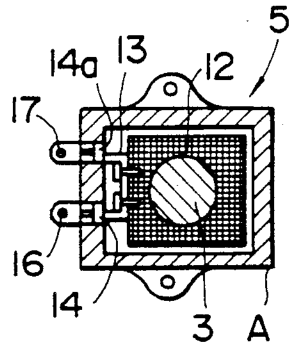
FIG. 2 is a cross section taken along the line X—X in FIG. 1.

Reference numeral 5 designates an example of proportional electric signal generating means. FIG. 2 is a cross section taken along the line X—X in FIG. 1, showing the detail of the proportional electric signal generating means 5. Referring to FIGS. 1 and 2, the proportional electric signal generating means 5 includes an insulator 12 adapted to be moved together with the push rod 3 and a body A surrounding the insulator 12. A resistance element 14 and a conductor 14a are provided in parallel relationship to each other on an inner surface of the body A, and they are electrically insulated from each other. A brush 13 is fixed on a side surface of the insulator 12 in such a manner as to simultaneously contact both the resistance element 14 and the conductor 14a and slide in a longitudinal direction thereof. Connection terminals 15 and 16 are spaced in the direction of movement of the push rod and are so provided as to externally extend from opposite ends of the resistance element 14, and a connection terminal 17 is similarly provided so as to externally extend from the conductor 14a. Electric wires 18, 19 and 20 are connected to the connection terminals 15, 16 and 17, respectively.

With the above construction of the control signal generating device 1, as the push rod 3 is moved downwardly, that is, the downward stroke of the operating lever 2 is increased, the pilot signal pressure from the hydraulic signal port 10 is increased. Furthermore, since the position of the brush 13 is changed in relation to the electric resistance between the connection terminals 15 and 16, the electric resistance between the connection terminals 16 and 17 or 15 and 17 is changed. Accordingly, when a supply voltage is applied between the electric wire 18 connected to the connection terminal 15 and the electric wire 19 connected to the connection terminal 16, an electric signal to be changed between the electric wires 19 and 20 or 18 and 20 can be taken out.

Figure 3:
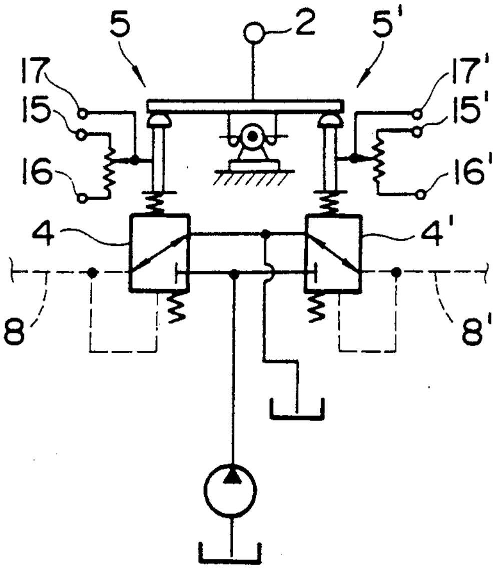
FIG. 3 is a schematic diagram of the electric and hydraulic system shown in FIG. 1.

FIG. 3 is a schematic diagram of the above-mentioned construction, showing that the control signal generating device 1 includes four push rods 3, and when the operating lever 2 is operated in two directions, that is, forward and reverse directions or right and left direction, the proportional hydraulic signal generating means 4 and 4' and the proportional electric signal generating means 5 and 5' are operated.

Figure 4:
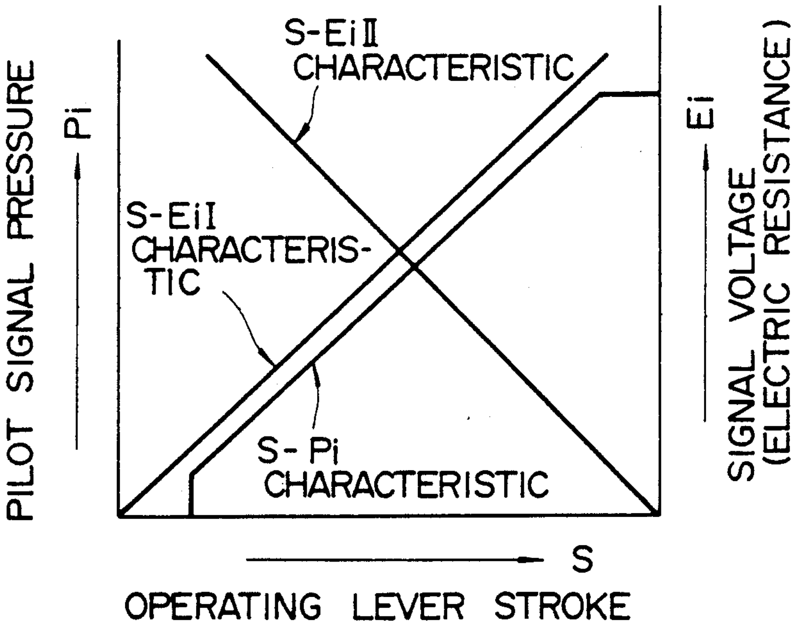
FIG. 4 is a characteristic graph of the signals from the control signal generating device.

FIG. 4 is a graph showing an example of characteristics of a pair of the proportional hydraulic signal generating means and the proportional electric signal generating means. Referring to FIG. 4, it is appreciated that as a stroke S of a single operating lever is increased, a pilot signal pressure Pi is increased as shown by an S-Pi characteristic, and a signal voltage Ei is increased as shown by an S-EiI characteristic, or it is decreased as shown by an S-EiII characteristic.

Figure 5:
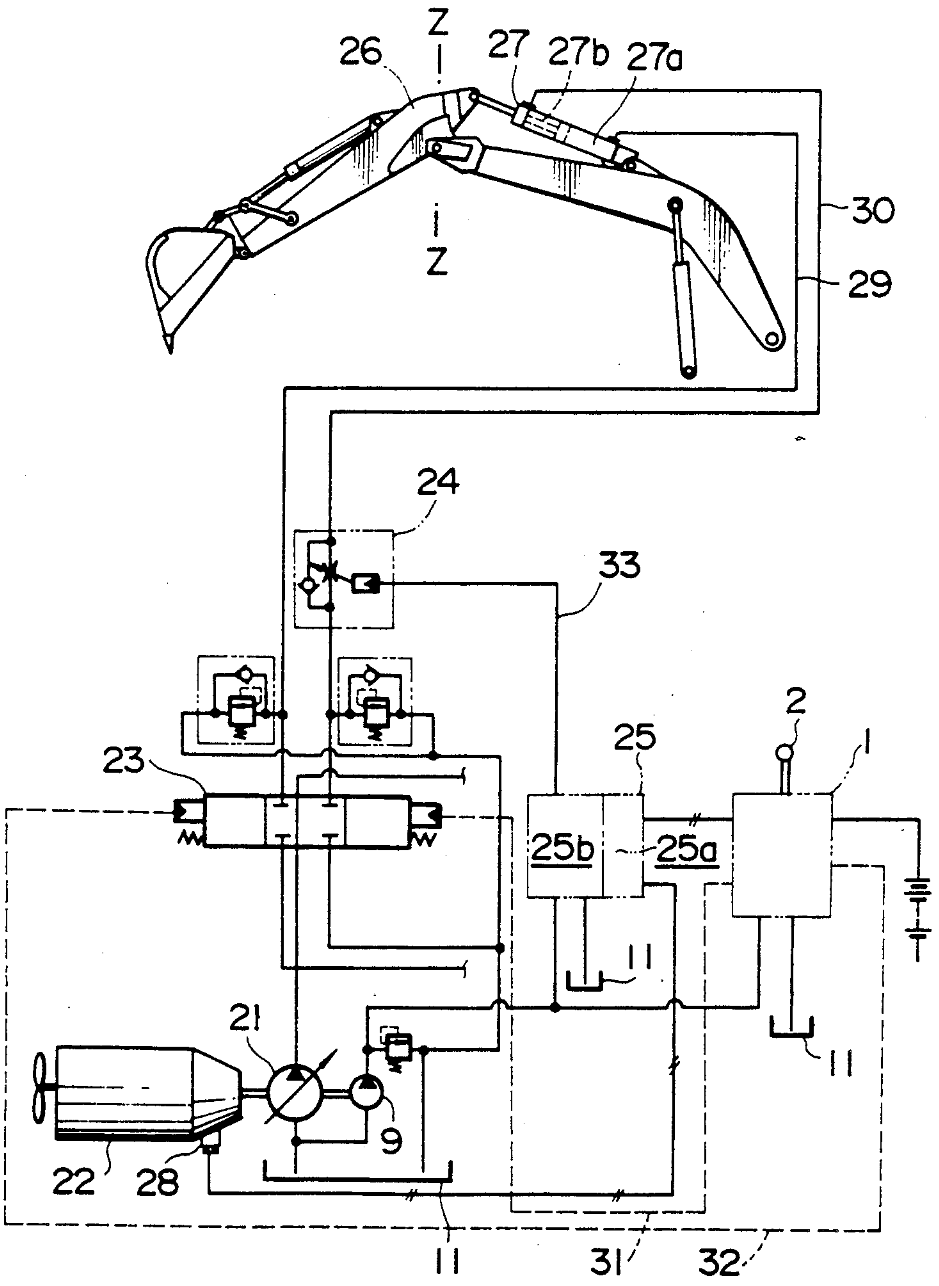
FIG. 5 is a diagrammatic view of the electric and hydraulic system for the operation of an arm in a hydraulic shovel utilizing the operation control method according to the present invention.
Figure 6:
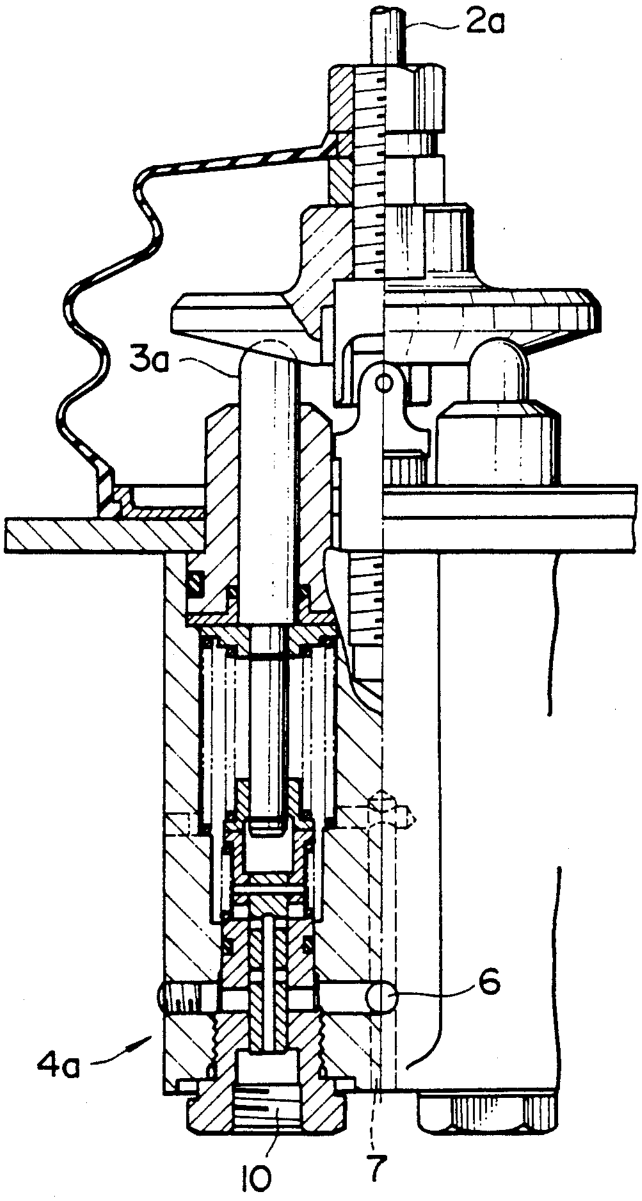
FIG. 6 PRIOR ART
FIG. 6 is a sectional view of an essential part of the hydraulic remote control valve in the prior art.
Figure 7:
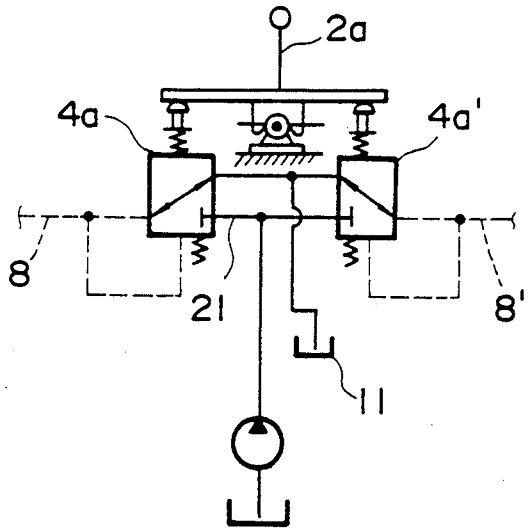
FIG. 7 PRIOR ART
FIG. 7 is a schematic diagram of the hydraulic system shown in FIG. 6.
Figure 8:
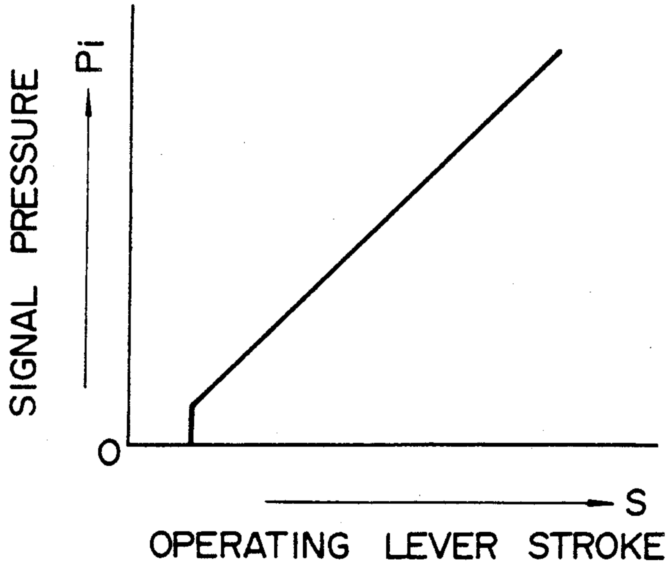
FIG. 8 PRIOR ART
FIG. 8 is a characteristic graph of the hydraulic signal of the remote control valve.
Figure 9:
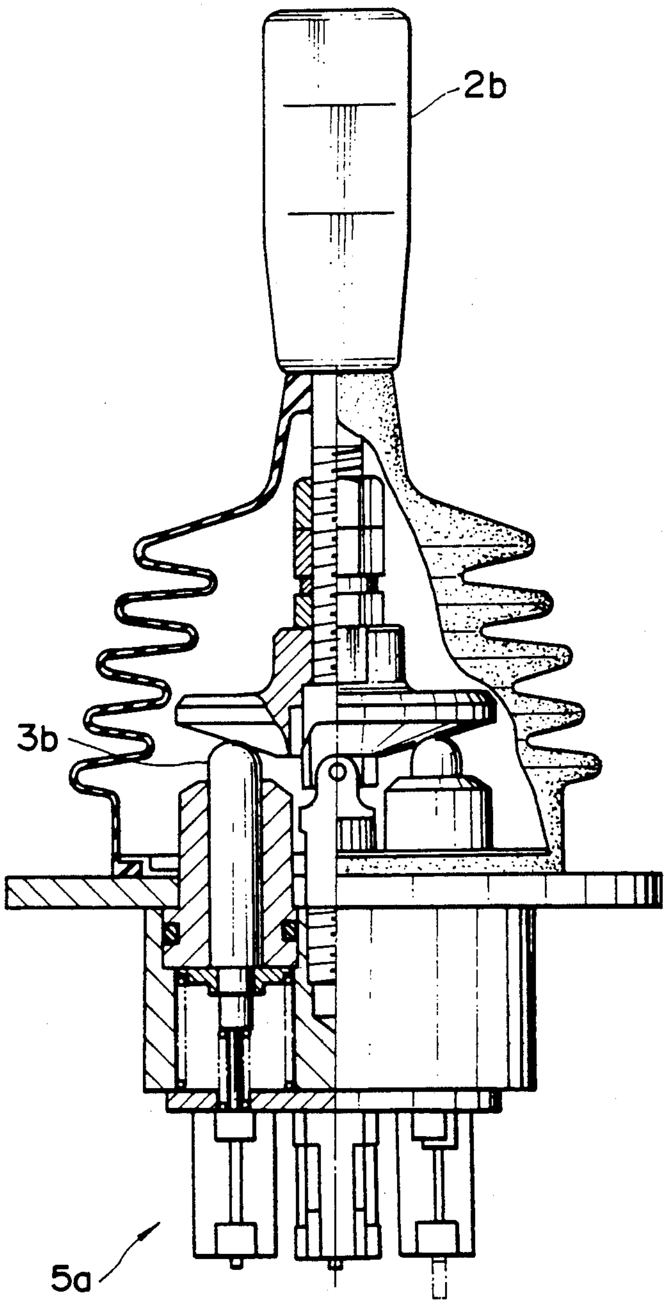
FIG. 9 PRIOR ART
FIG. 9 is a sectional view of an essential part of the joy stick in the prior art.
Figure 10:
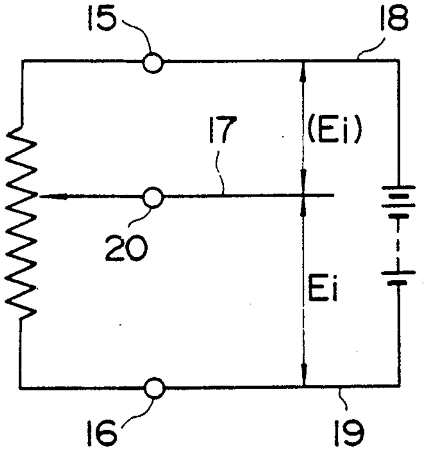
FIG. 10 PRIOR ART
FIG. 10 is a schematic diagram of the electric system shown in FIG. 9.
Figure 11:
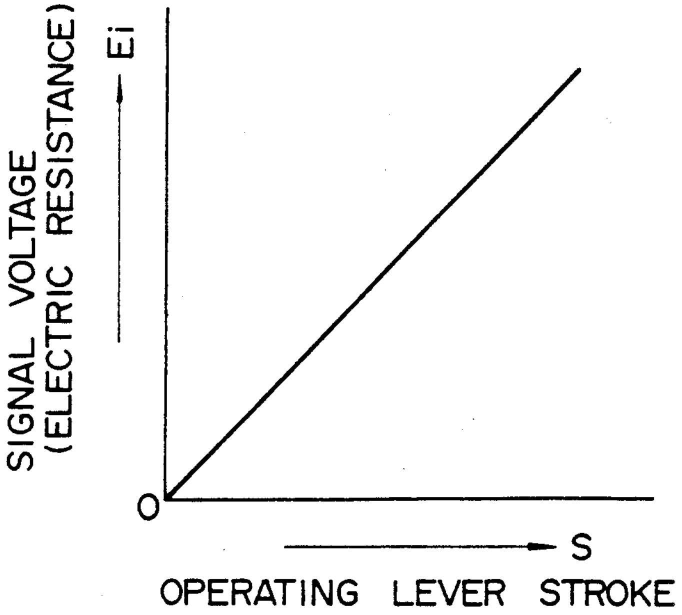
FIG. 11 PRIOR ART
FIG. 11 is a characteristic graph of the electric signal of the joy stick.

An example of a control method for a construction machine provided with a control signal generating device having the characteristics as mentioned above will now be described with reference to FIG. 5 showing a hydraulic system of an arm cylinder which is one of actuators for operating a working device of a hydraulic shovel.

Referring to FIG. 5, reference numerals 21 and 9 designate a main pump and a pilot pump to be driven by an engine 22. The main pump 21 functions to supply a pressure oil to a hydraulic selector valve 23 for expanding and contracting an arm cylinder 27 for rotating an arm 26 and hydraulic selector valves for the other actuators. The pilot pump 9 functions primarily as a hydraulic source for an operating system such as the control signal generating device 1 according to the present invention and a controller 25 to be hereinafter described.

Reference numeral 24 designates a variable slow return valve provided intermediate of a line 30 connecting a rod-side oil chamber **27*b* of the arm cylinder 27 to a hydraulic selector valve 23. The variable slow return valve 24 is comprised of a check valve and a throttle valve for changing a throttling effect according to a magnitude of an external signal. Reference numeral 27*a* designates a head-side oil chamber connected through a line 29 to the hydraulic selector valve 23. Reference numeral 28 designates an engine speed sensor for taking out a rotational speed of the engine 22** as an electric signal.

The controlling 25 includes a computing section **25*a* for receiving the electric signals from the control signal generating device 1 and the engine speed sensor 28. The computing section 25*a* feeds to a signal converting section 25*b* of the controller 25 a new electric signal to be obtained on the basis of a previously programmed rule according to a magnitude of these electric signals in combination. The new electric signal received by the signal converting section 25*b* is converted into a pressure signal which is in turn output to a line 33 and is supplied to a receiving section of the variable slow return valve 24. Reference numerals 31 and 32 designate pilot lines for transmitting a hydraulic signal to be obtained by the operation of the operating lever 2 of the control signal generating device 1 to a receiving section of the hydraulic selector valve 23**.

In any other constructions similar to the above construction of the arm and the arm cylinder of the hydraulic shovel, almost similar phenomenon is realized. Generally, as apparent from FIG. 5, when a position of center of gravity of the arm 26 including a tool mounted thereto, an attached device and a working load is located on the left side with respect to a vertical line Z-Z passing through a center of rotation of the arm 26, the arm cylinder 27 receives a force in its forcibly expanding direction by the dead weight of the arm 26 including the tool, the attached device and the working load. Accordingly, when a discharge oil quantity of the main pump 21 is less than a standard quantity, that is, when the engine 22 is driven at low speeds or a selected opening of the hydraulic selector valve 23 is improper during expanding the arm cylinder 27 from its contracted condition, the pressure oil in the rodside oil chamber **27*b* is returned through the line 30 and the hydraulic selector valve 23 to a tank 11 to thereby expand the arm cylinder 27 at a speed higher than that where the discharge oil from the main pump 21 is supplied through the hydraulic selector valve 23 and the line 29 to the head-side oil chamber 27*a* to expand the arm cylinder 27. As a result, a vacuum-like void is generated in the head-side oil chamber 27*a*, causing an operational failure such that when the arm 26** is intended to be continuously further rotated, the rotation is temporarily stopped. Thus, an operator attending to a minute work requires to have a considerable skill.

For the purpose of preventing such a phenomenon as mentioned above, there are provided in the prior art a check valve functioning as a free passage toward the rod-side oil chamber **27*b* and a throttle valve parallel to the check valve at an intermediate position in the line 30. With this construction, when the engine speed is slightly less than a rated speed under a normal working load, a throttling effect of the throttle valve is provided to an extent such that no void is generated in the head-side oil chamber 27*a***.

However, a single hydraulic shovel or a like working machine is employed for various works as in these days, and a working mode is varied for example, fast and slow working and rough and fine working. Furthermore, it is desired to effect these various works with various working modes economically without a special operation skill and a specific operation.

In such a circumstance, the operation control method and device as shown in FIG. 5 according to the present invention can easily satisfy the above desire.

More specifically, when the operating lever 2 is operated to expand the arm cylinder 27 from its contracted condition and thereby rotate the arm 26, a pilot pressure signal is transmitted from the control signal generating device 1 through the pilot line 31 or 32 to the hydraulic selector valve 23 to operate the same to an opening degree proportional to an operation stroke of the operating lever 2 in the same manner as the conventional hydraulic remote control valve. At the same time, an electric signal proportional to the operation stroke of the operating lever 2 is generated from the control signal generating device. On the other hand, an electric signal proportional to an engine speed of the engine 22 is generated from the engine speed sensor 28. These electric signals are transmitted through the electric wires to the computing section **25*a* of the controller 25, and an output signal from the signal converting section 25*b* is transmitted to the variable throttle valve in the slow return valve 24** to thereby regulate the throttling effect of the throttle valve.

The previously programmed rule in the computing section **25*a* as mentioned above is such that a signal for properly exhibiting the throttling effect of the variable throttle valve in the slow return valve 24 to such an extent that no void is generated in the head-side oil chamber 27*a* of the arm cylinder 27 expanding at a discharge quantity of the main pump 21 according to the opening degree of the hydraulic selector valve 23 and the engine speed of the engine 22 is output from the signal converting section 25*b***.

Although the information to be input to the computing section **25*a* of the controller 25 consists of the electric signals from the control signal generating device 1 and the engine speed sensor 28 in the above preferred embodiment, various information such as a pressure in the line 30 indicative of a load condition and an angle of the arm 26 may be input in combination with the information from the control signal generating device 1**.

Further, although the control signals are generated from a pair of proportional hydraulic signal generating means and proportional electric signal generating means by the movement of one push rod in the one-directional operation of the single operating lever, the present invention is not limited to the pair but each of the proportional hydraulic signal generating means and the proportional electric signal generating means may be designed to simultaneously generate a plurality of signals and utilize these signals for a plurality of control systems.

According to the operation control method of the present invention, a plurality of different signals are simultaneously obtained by the operation of a single operating lever. Some of the signals are applied to the operation of a main operating section, and the other signals are directly applied to a control system necessary for a special operation of the main operating section or the other control system. Alternatively, the other signals are added to information to be obtained from the operating and working conditions of the machine to obtain a new control signal which is applied to the above control system. Accordingly, the operation of the construction machine is rationalized, and the operating work by the operator can be simplified. That is, even if the operator is not skilled, he is not forced to carry out a minute lever operation. Thus, the construction machine can be operated to effect a close work smoothly, accurately, safely and quickly. Further, by applying the above-mentioned control method to the operation control device of the present invention, the number of the operating lever can be reduced to thereby simplify the operating station with sufficient functions, less mistakes in operation and economic effect.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An operation control method for a remote control system in a construction machine in which an operating lever is operated to generate a signal proportional to an operation quantity of said operating lever and operate said construction machine according to said signal the operation control method using as said operating lever a single lever, said signal comprising a plurality of signals including hydraulic and electric signals proportional to the operation quantity of said single lever, said method comprising the steps of:

simultaneously generating said plural signals including generating the electric signals by sensing movement of said operating lever by the operation of said single lever, and supplying said plural signals to various control devices.

2. In a pilot valve for use with an electrohydraulic remote control system in a construction machine, an operation control device comprising:

an operating lever, a member moved according to an operation quantity of said operating lever, and a plurality of signal generating means simultaneously operated by said member, including a hydraulic signal generating means for reducing a hydraulic pressure from a hydraulic source in proportion to a moving quantity of said member and generating a pilot hydraulic signal and a separate electrical signal generating means for sensing movement of said member and for simultaneously generating an electric signal proportional to the moving quantity of said member.

3. The pilot valve of claim 2 wherein said member comprises a longitudinally movable push rod.

4. The pilot valve of claim 3 wherein said hydraulic signal generating means comprise at least one proportional hydraulic signal generating device actuated by movement of said push rod.

5. The pilot valve of claim 3 wherein said electrical signal generating means comprise:

an insulator mounted for movement with said push rod;

a resistance element having terminals spaced from one another in the direction of movement of said push rod; and a brush mounted to said insulator and contacting said resistance element.

6. The pilot valve of claim 5 including a conductor contacted by said brush.

* * * * *